United States Patent

Summers

[15] 3,680,365
[45] Aug. 1, 1972

[54] STRAIN GAGE MONITOR

[72] Inventor: McGarvey G. Summers, 125 Weller Ave., Dayton, Ohio 45459

[22] Filed: Feb. 17, 1970

[21] Appl. No.: 11,966

[52] U.S. Cl. ........................73/88.5 R, 73/141 A
[51] Int. Cl. .................................................G01b 7/18
[58] Field of Search ................73/88.5, 141; 324/111

[56] References Cited

UNITED STATES PATENTS

| | | | |
|---|---|---|---|
| 2,547,926 | 4/1951 | Cook | 73/88.5 R |
| 2,924,968 | 2/1960 | Colten et al. | 73/88.5 R |
| 3,169,394 | 2/1965 | Vosteen et al. | 73/141 A X |
| 3,197,697 | 7/1965 | McCauley | 73/88.5 R X |
| 3,477,286 | 11/1969 | Baker | 73/88.5 R X |

*Primary Examiner*—Charles A. Ruehl
*Attorney*—John P. Tarlano

[57] ABSTRACT

The present invention relates to a strain gage monitor for sensing the strain upon a strain gage. The strain gage monitor incorporates a reference bridge for standardizing overall strain gage monitor circuit parameters to allow for strain gage monitor interchangeability. The strain monitor circuit incorporates oscillator and remote sense amplifier means for remote sensing of strain gage signals. It incorporates electrometer means for storing of strain gage signals. The strain gage monitor incorporates an error amplifier means for correcting spurious strain gage signals whenever improperly stored.

2 Claims, 4 Drawing Figures

INVENTOR
McGARVEY G. SUMMERS
BY John P. Tarlano
HIS ATTORNEY

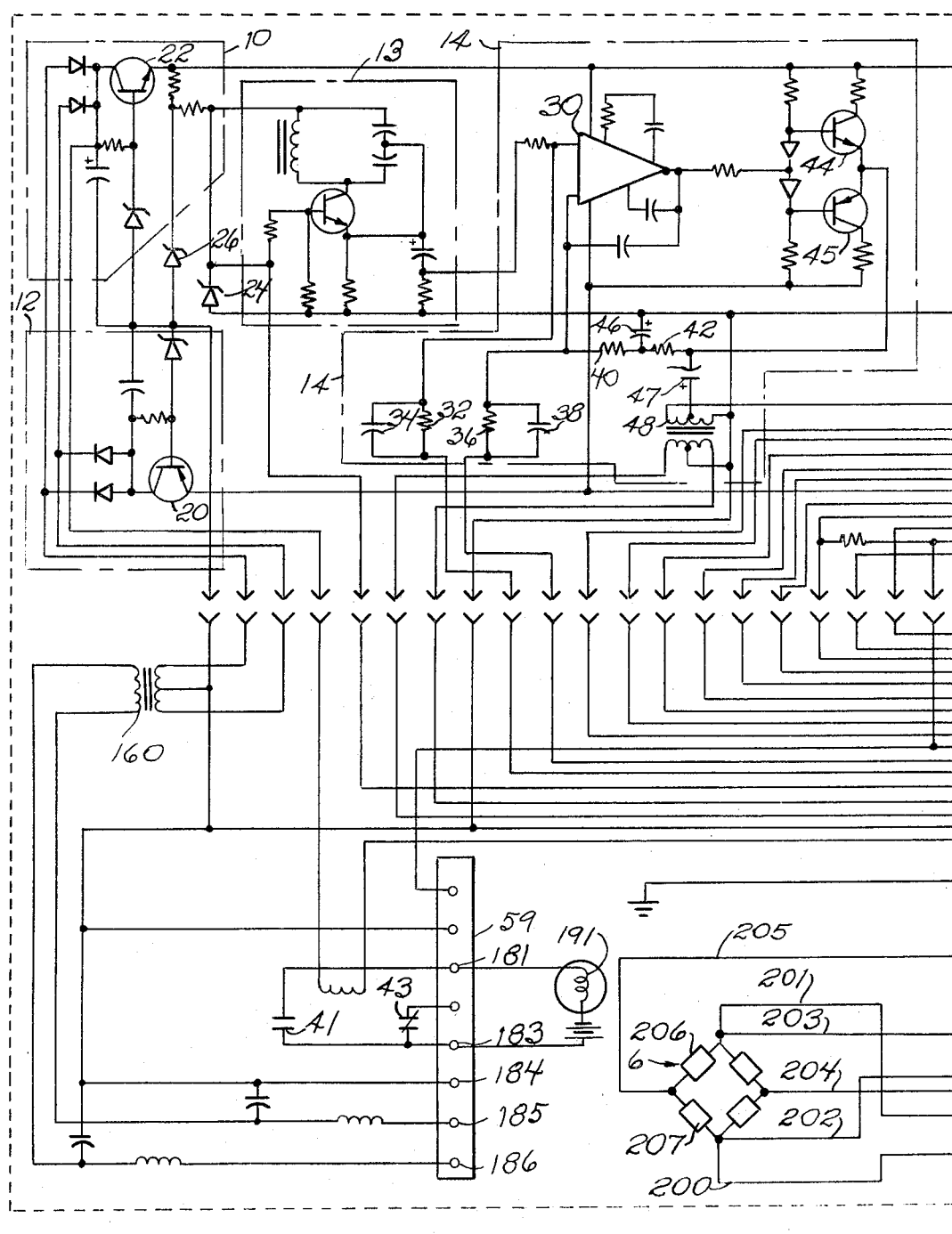
FIG. 2-A

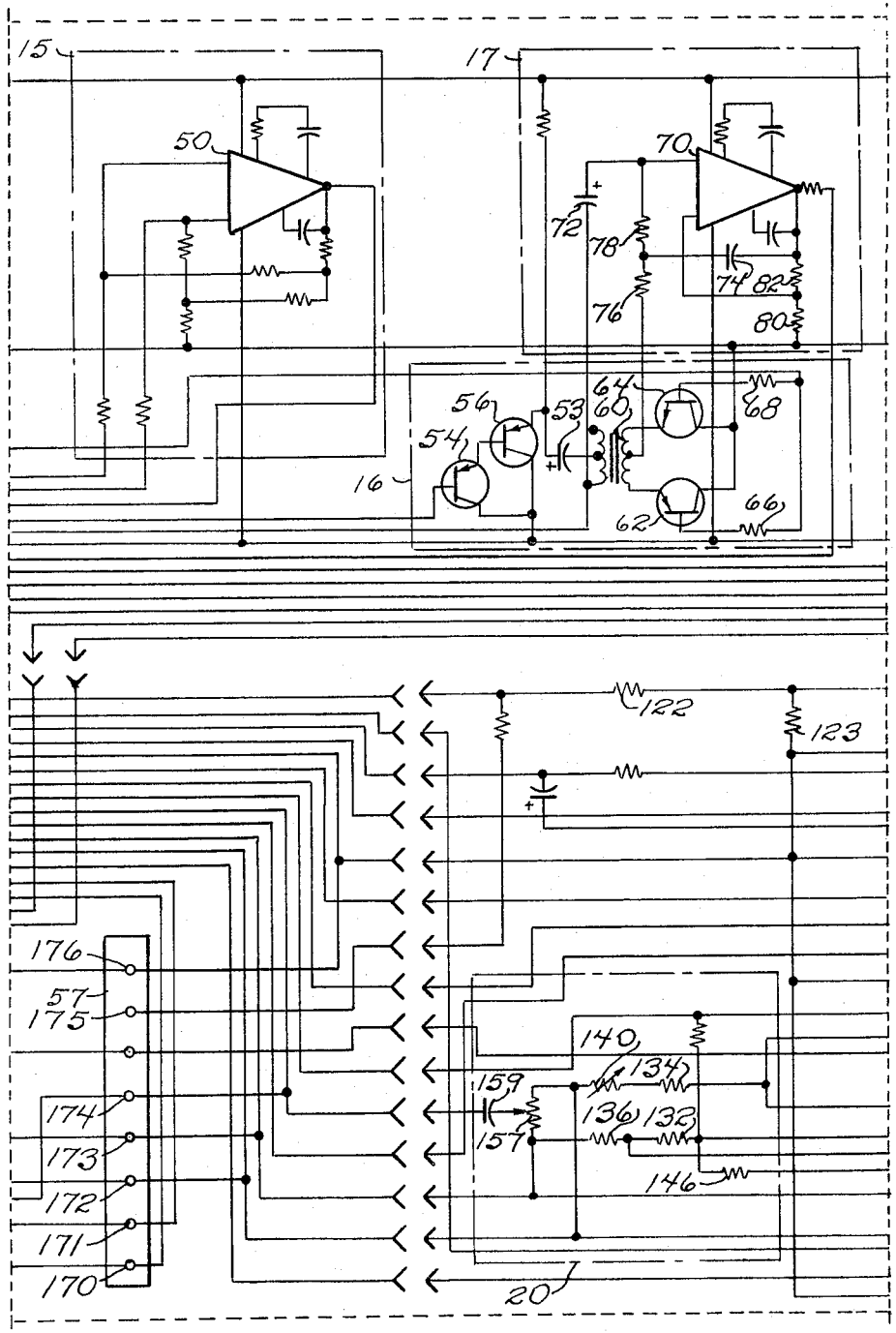
FIG. 2-B

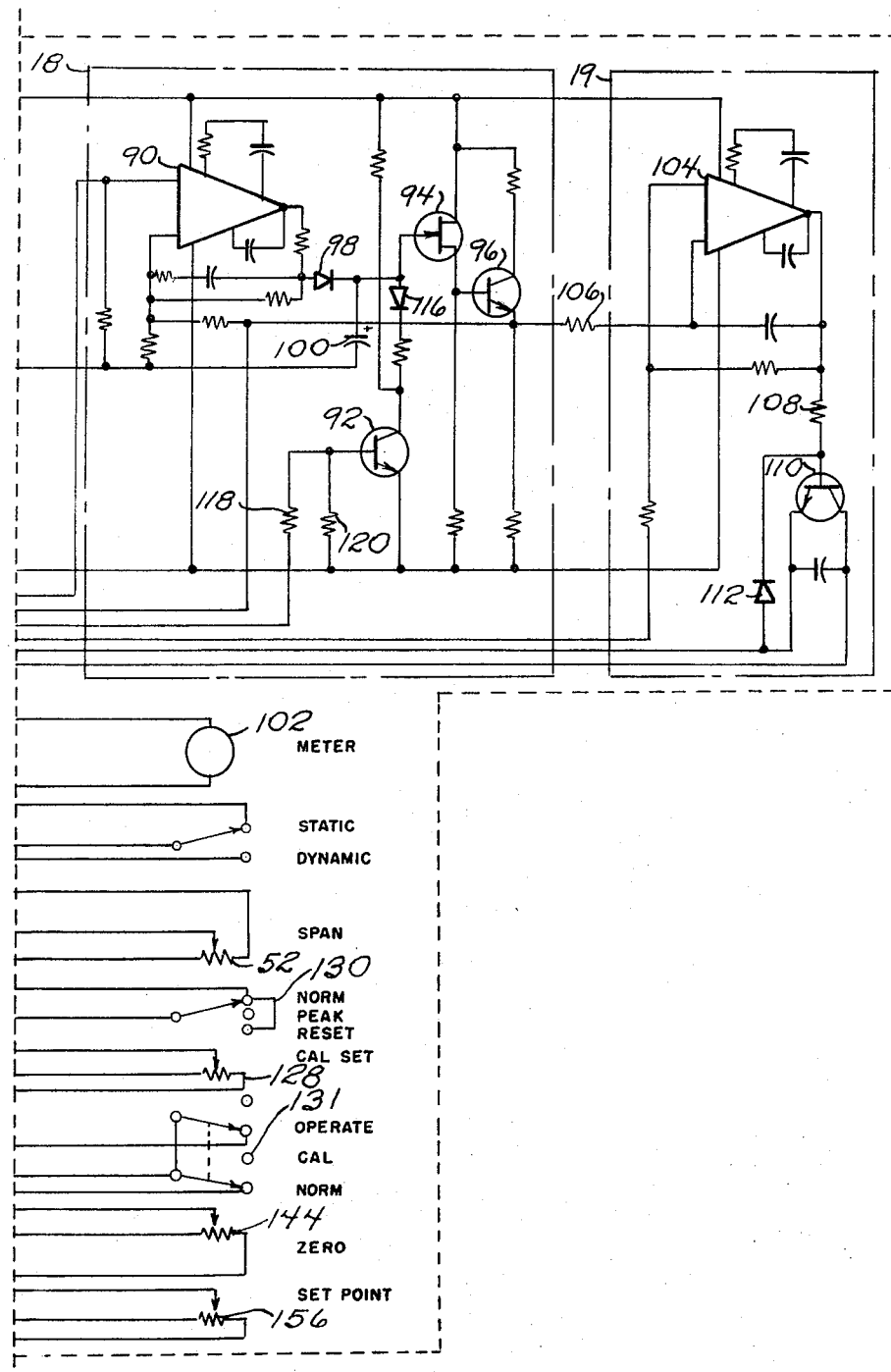
FIG. 2-C 3,680,365

STRAIN GAGE MONITOR

BACKGROUND OF THE INVENTION

In the prior art strain gage monitors have been used. Such strain gage monitors, however, have not incorporated the stabilizing and sensing means of the strain gage monitor of the present invention.

The strain gage monitor of the present invention incorporates an oscillator means and an oscillator remote sensing amplifier means for activating and sensing a strain gage transducer means mounted on a punch press. The oscillator remote sensing amplifier means minimizes capacitive effects of long strain gage cables to a strain gage transducer means mounted on a punch press.

In the strain gage monitor of the present invention, an error amplifier means and limit detector amplifier means have been incorporated with an electrometer means to provide for correction for storage of spurious signals in the electrometer. The strain gage monitor of the present invention provides a reference bridge means so that the overall parameters of the strain gage monitor may be adjusted to allow for interchangeability among strain gage monitors.

SUMMARY OF THE INVENTION

The present invention relates to a strain gage monitor for amplifying, conditioning and presenting a strain gage signal, from a strain gage transducer means, comprising a first regulated power supply means for supplying a regulated positive 15 Volt DC amplifier voltage, a second regulated power supply means for supplying a regulated negative 15 Volt DC amplifier voltage, oscillator means connected to the first and second regulated power supplies for supplying a five kilocycle reference signal, an oscillator remote sensing amplifier means connected to the oscillator means for driving said strain gage transducer means, a differential amplifier means connected to the strain gage transducer means for amplifying a strain gage five kilocycle signal there from when the strain gage transducer means is unbalanced due to a strain thereon, a demodulator means for converting the value of the amplitude of the five kilocycle signal from the strain gage transducer means to a DC voltage value, the value of the amplitude of the five kilocycle signal being proportional to the amount of strain on said gage transducer means, an operational amplifier active filter system means connected to the demodulator means for amplifying the demodulated strain gage transducer signal and eliminating transients, a peak memory system means connected to the operational amplifier active filter system, including an electrometer connected to the operational amplifier active filter the highest value of a demodulated strain gage signal from the strain gage transducer means over a fixed finite period of time, an error amplifier connected to the electrometer for sensing of information improperly stored in said electrometer and for correcting for said improper storage, and a saturated switch connected to said electrometer for converting the electrometer output to a continuous output, and indicator means connected to said peak memory system for displaying the output there from to indicate the amount of strain on said strain gage transducer means.

An object of the present invention is to provide a strain gage monitor which is extremely sensitive to strain signals from a strain gage transducer means mounted on a punch press, but insensitive to spurious signals from said strain gage transducer and other external influences.

Another object of the present invention is to provide a strain gage monitor which has drift-free solid state circuitry to allow for precise measurement of the percentage of allowable strain of a punch press, as sensed from a strain gage transducer means.

Another object is to provide a strain gage monitor with easily reproduced overall system parameters, to measure the strain produced on a strain gage transducer means mounted on a punch press during punch press operation.

DESCRIPTION OF THE DRAWING

FIG. 2a is a diagram of the power supply means, oscillator means and oscillator remote sense amplifier means elements of the strain gage monitor connected to a strain gage transducer means, which may be used with FIGS. 2b and 2c.

FIG. 2b is a diagram of a differential amplifier means, a demodulator system means, and an active filter system means of the strain gage monitor of the present invention, which may be used with FIGS. 2a and 2c.

FIG. 2c is a diagram of a peak memory strain means, a limit detector amplifier system means, and a reference bridge means of the strain gage monitor of the present invention, which may be used with FIGS. 2a and 2b.

DESCRIPTION OF THE PREFERRED EMBODIMENT

Figure 1:
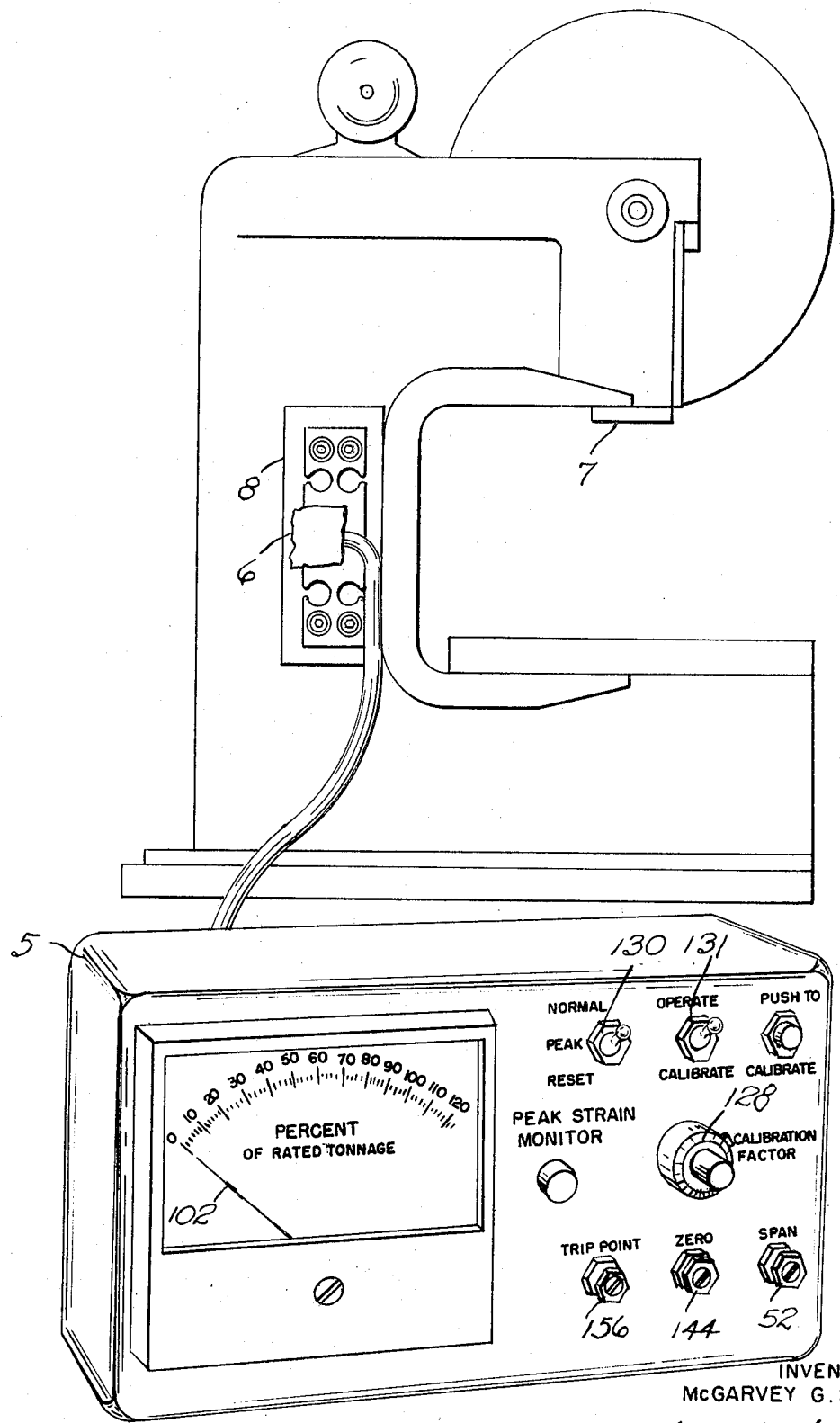
FIG. 1 is a perspective view of a strain gage monitor used to record the amount of strain placed on a punch press, as sensed by a strain gage transducer means.

FIG. 1 shows a strain gage monitor 5 connected to a strain gage transducer means 6. The strain gage transducer means 6 measures the amount of strain exerted on a punch press 7 at point 8 during its operating. The strain gage monitor 5 has a meter 102 mounted thereon to indicate the amount of strain being exerted on the punch press 7 at point 8 during its operation. Span potentiometer 52 expands the scale of meter 102 from zero to 100 percent for zero to maximum allowable strain on punch press 7. Normal, peak, and reset switch 130 allows the strain gage monitor 5 to record the average or peak strain on punch press 7, or to return the meter 102 to zero.

A calibration set potentiometer 128 is used to calibrate the meter 102 to 100 percent when a maximum allowable strain is placed on punch press 7.

An operate-calibrate switch 131 is used in calibrating the strain gage monitor 5 or in operating the strain gage monitor 5.

A zero potentiometer 144 is used to zero the meter 102 when a zero strain is on the strain gage transducer means 6.

A trip point potentiometer 156 is used to set a maximum percentage of strain which can be placed on punch press 7 before a trip point relay is tripped to indicate a strain on the punch press 7 beyond a certain chosen set point.

As shown in FIGS. 2a and 2b, terminal strip 57 has the + excitation lead 200 of strain gage transducer means 6 connected to its position 170 and the − excitation lead 201 connected to position 171. The + excitation sensing lead 202 and the − excitation sensing lead 203 of the strain gage transducer 6 are connected to the positions 172 and 173 of the terminal strip 57. The + signal lead 204 and − signal lead 205 of the strain gage transducer means 6 are connected to the positions 174 and 175.

Position 176 is grounded. Leg 206 of the strain gage transducer 6 helps form an active strain gage transducer 6. Leg 207 of the strain gage transducer 6 compensates for the temperature in the strain gage transducer 6.

A 115 Volt, 60 cycle per second power source is connected to positions 186 and 185 of terminal strip 59 shown in FIG. 2a. Position 184 is grounded. An indicator light 191 shows when the strain on the punch press 7 is greater than the set point value is connected between positions 181 and 183 of terminal strip 59.

As shown in FIG. 2a, transistors 20 and 22 are the power supply regulators of power supplies means 10 and power supply means 12. Power supply means 10 is a + 15 Volt regulated power supply. Power supply means 12 is a − 15 Volt regulated power supply. Zener diodes 24 and 26 are reference diodes used in the highly regulated power supplies means 10 and 12.

Oscillator means 13 supplies a 5 kilocycle reference sine wave for a strain gage driver amplifier means 14. Strain gage driver amplifier means 14 drives a strain gage transducer means 6. Strain gage driver amplifier means 14 contains a differential amplifier 30 which amplifies signals from oscillator means 13. Differential amplifier 30 has a differential input configuration with resistor 32 paralleled with capacitor 34 and resistor 36 paralleled with capacitor 38. Differential amplifier 30 amplifies signals from oscillator means 13, with feedback to differential amplifier means 30 via resistor 40 and resistor 42 decoupled by capacitor 46. The power output of the differential amplifier 30 is not sufficient to drive a strain gage transducer means 6. Therefore, transistors 45 and 44 are inserted as a class AB power amplifier, so that the power level is increased. Capacitor 47 couples the output of the class AB power supply to the primary winding of transformer 48.

This output coupling establishes a split drive for the strain gage transducer means 6. The split drive minimizes the line and cable capacitive effects between strain gage transducer means 6 and strain gage monitor 5 since it established the signal leads at approximately ground potential. The split drive also minimizes balance problems on long cables between strain gage monitor 5 and punch press 7.

Shown in FIG. 2b is a differential amplifier means 15 for amplifying a strain gage transducer signal. Differential amplifier 50 acts as an input signal conditioning amplifier. Differential amplifier 50 is connected to the strain gage transducer means 6 and also to the calibration set potentiometer 128 shown in FIG. 2c.

DIfferential amplifier 50 is in a balanced differential amplifier configuration to minimize cable capacitance effects of a long cable. The gain of the differential amplifier 50 is fixed. The output of 50 is sent to the span potentiometer 52, shown in FIG. 2c.

The divided off signal from span potentiometer 52 is buffered from span potentiometer 52 by transistors 54 and 56 which form a Darlington emitter follower circuit. The output of the Darlington emitter follower circuit is coupled through capacitor 53 to transformer 60. Transformer 60 acts as a demodulator transformer. Transistor 62 and 64 act as demodulator transistors.

Transistors 62 and 64 form a demodulator system means 16 for converting a carrier amplitude change to a DC voltage proportional to a strain gage signal from strain gage transducer means 6. The drive for the demodulator system means 16 is derived from the same transformer 48 that is used in the excitation split drive circuit. The driver of the demodulator system means 16 is coupled to the demodulator transistors 62 and 64 through resistors 66 and 68.

An operational amplifier active filter system means 17 is used to amplify a strain gage transducer signal and eliminate unwanted transients. The operational amplifier active filter system means 17 has a differential amplifier 70 therein. The 3 db down point of differential amplifier 70 is approximately one kilocycle. The operational amplifier means is modified to make its time domain response suitable for the peak memory system means 18 by which it is followed. Signal overshoot is thus avoided.

The frequency determining components of the operational amplifier active filter system means 17 and the capacitors 72 and 74 and the resistors 76 and 78, 80 and 82. Resistors 80 and 82 are also used as the operational amplifier gain determining resistors of the active filter system means 17. The active filter system means 17 has a net gain of 10.

As shown in FIG. 2c, the output of the operational amplifier active filter system means 17 is coupled to a peak memory system means 18. The peak memory system means 18 is composed of an peak amplifier 90, an electrometer, a buffer transistor means 96 and a transistor switch 92. The electrometer is composed of transistors 94 and 96. The transistor switch 92 is connected to a charging diode 98 and a memory storage capacitor 100.

The output of the differential amplifier 70 is coupled to the input of the peak amplifier 90. The D.C. gain of this amplifier 90 is approximately five. The output of the peak amplifier 90 is a D.C. voltage proportional to the actual signal generated by the strain gage bridge. This D.C. voltage is coupled to the memory storage capacitor 100 by means of diode 98. The electrometer is composed of transistors 94 and 96. Transistor 94 is driven by the D.C. voltage on the memory storagecapacitor 100, and is directly coupled to transistor 96 whose emitter drives the indicating meter 102 with a D.C. current proportional to the voltage on the memory storage capacitor 100. The transistor switch 92 is biased to cutoff in the Peak position of the Peak-Normal-Reset switch 130. That is no current flows when this switch 130 is in said Peak position. When the Peak-Normal-Reset switch 130 is placed in either the Normal or Reset position, transistor switch 92 is biased so that current can flow through it. The collector circuit of the transistor switch 92 then allows the memory storage capacitor 100 to discharge, and thus to follow the D.C. voltage output of the peak amplifier 90. The following occurs on both rising and falling outputs of the peak amplifier 90, as opposed to storing the highest value of the D.C. output of the peak amplifier when the Peak-Normal-Reset switch 130 was in the Peak position.

A feedback loop in the peak memory system means 18 returns approximately one fifth the value of the output of the electrometer to the inverting input of Peak amplifier 90. The non-inverting input to Peak amplifier 90 is driven by the strain from strain gage transducer means 6. When the non-inverting input is driven positive by the signal, the inverting input follows positive due to the feed back circuit network of the peak amplifier 90. The diode 98 is made conductive and charges the memory capacitor 100. The electrometer buffers this voltage against the load of the feedback circuit and against the load of the limit detector amplifier 104, of limit detector amplifier system means 19. The electrometer buffer transistor means 96 also feeds voltage back to Peak amplifier 90. When the voltage on capacitor 100 approaches a value which causes a voltage at the inverting input of Peak amplifier 90 to be equal to the voltage at the non-inverting input of Peak amplifier 90, the output of the Peak amplifier goes to approximately zero voltage. As the voltage on the non-inverting input descends on the negative slope of the peak voltage curve, the voltage at the output of Peak amplifier 90 goes negative to approximately − 13 Volts. Diode 98 is back biased, so that it will no longer influence capacitor 100, the memory storage capacitor. The output of the peak memory system means 18 is fed to meter 102, and to the limit detector amplifier 104 of limit detector amplifier system means 19 via resistor 106.

The limit detector amplifier system means 19 compares the incoming signal from Peak memory system means 18 with a pre-set reference signal from set point potentiometer means 156 shown in FIG. 2c, to enable or disenable relay 41 shown in FIG. 2a.

Limit detector amplifier 104 uses the inverting input of peak amplifier 90 as its inverting input. A reference voltage is fed to the non-inverting input of limit detector amplifier 104. The output of limit detector amplifier 104 is coupled through resistor 108 to transistor 110 which acts as a relay driver. The emitter to base breakdown of transistor 110 is prevented by means of diode 112. Both normally open relay 41 and normally closed relay 43 are available on the barrier terminal strip 59.

Transistor 92 in peak memory system means 18 converts the peak memory system 18 from a normal circuit to a peak circuit by drawing a current through diode 116 when the peak strain monitor is switched to a peak mode, but not drawing current through diode 116 when strain gage monitor is switched to a normal mode. Transistor 92 acts as a saturated switch.

The input circuitry to transistor 92 is comprised of resistors 118 and 120. The input to resistor 118 should be held at ground potential to place the circuit in the normal mode of operation.

The output of the electrometer which drives meter 102 is at a level of approximately five Volts DC. Meter series resistor 122 shown in FIG. 2b allows a current of approximately zero to 1.2 milliamps to pass through meter 102. This amount of current causes a zero to full scale meter deflection, since resistor 23 parallels the meter 102 to ground.

Calibration set potentiometer 126 provides a secondary bridge which may be offset a calibrated amount by using calibration potentiometer 128. Normal peak reset switch 130 is provided for placing the strain gage monitors in a normal, peak or reset mode.

As shown in FIG. 2b reference bridge means 20 allow for standardized strain gage monitor input system parameters so as to allow for strain gage monitor interchangeability in event of a malfunction.

Resistor 140 of reference bridge 20 is an internal adjustment for factory use, which enables all strain gage monitors 5 to be set up with a standard full scale input reference. This internal adjustment makes the strain gage monitor 5 virtually independent of the parameters of the individual circuit elements in the strain gage monitor 5 input system.

As shown in FIG. 2c, zero potentiometer 144 acts as a variable shunt on the reference bridge 20. Zero potentiometer 144 has an isolation resistor 146 which isolates it from the negative corner of the reference bridge means 20. The load of zero potentiometer 144 is compensated by a calibration network on the other corner of the reference bridge means 20.

As shown in FIG. 2b, capacitive "C" balance is of long cables provided for in the strain gage monitor 5 of the present invention by means of potentiometer 157 and capacitor 159. THe "C" balance compensates for phase shift between excitation and signal in cables of varying lengths.

The set point for limit detector amplifier 104 is selected by means of set point potentiometer 156. The power for set point potentiometer 156 is derived from diode 24 shown in FIG. 2a.

As shown in FIG. 2a, the strain gage monitor 5 of the present invention has a power line inductively coupled into it by means of power transformer 160. The peak strain monitor circuit is capacitively decoupled to a ground line. The input voltage may vary from 90 to 135 Volts AC without deterioration of accuracy of performance of the strain gage monitor 5.

To calibrate the strain gage monitor 5, the following procedure should be used. First, the normal, peak, reset switch 130 is placed in the normal position, then the operate, calibrate switch 131 is placed in the calibrate position. The span potentiometer 52 is adjusted until meter 102 reads 100 percent. The normal, peak, reset switch 130 is returned to its peak position and operate calibrate switch 131 is returned to its operate position.

The trip point of the strain gage monitor 5 is set by the following procedure. The normal, peak, reset switch 130 is placed in the normal position. The operate calibrate switch 131 is placed in the calibrate position. The calibrate potentiometer R8 is turned from its initial calibration position to make the meter 102 read the desired trip point to make the relay 41 operate. The trip point potentiometer 156 is adjusted so that relay 41 just operates.

The calibration potentiometer 128 is returned to its initial calibration position. The normal, peak, reset switch 130 is returned to its peak position.

The calibrate operate switch 131 is returned to its operate position, the relay 41 will switch when the percentage of maximum strain of strain on the punch press 7 exceeds the chosen trip point percentage.

A list of the circuit components and their identification is as follows:

| Component | Identification | Component | Identification |
|---|---|---|---|
| 22 | 2N4921 | 70 | SN72709N |
| 20 | 2N4918 | 72 | .33 MF |
| 24 | 1N823A | 74 | 0.033 MF |
| 26 | 1N714A | 76 | 10K |
| 30 | SN72709N | 78 | 470K |
| 32 | 100K | 80 | 10K |
| 34 | 39 pico farads | 82 | 90.9K |
| 36 | 100K | 90 | SN72709N |
| 38 | 39 pico farads | 94 | 2N3819 |
| 40 | 30K | 92 | 2N3704 |
| 42 | 18K | 96 | 2N3704 |
| 43 | 2N4918 | 98 | 1N645 |
| 44 | 2N4921 | 100 | 1 MF |
| 46 | .47 MF | 104 | SN72709N |
| 47 | 50 MF | 106 | 10K |
| 48 | TR—5 | 108 | 15K |
| 50 | SN72709N | 110 | 0.047 MF |
| 54 | 2N3702 | 112 | 1N645 |
| 53 | 50 MF | 116 | FD333 |
| 56 | 2N3702 | 118 | 15K |
| 60 | TR—5 | 120 | 4700K |
| 62 | 2N1307 | 122 | 4302K |
| 64 | 2N1306 | 123 | 82.5K |
| 66 | 22K | 132 | 100K |
| 68 | 22K | 134 | 42.2K |
| 136 | 45.3K | | |
| 140 | 5K | | |
| 146 | 100K | | |
| 157 | 10K | | |
| 159 | 150 PF | | |

What is claimed is:

1. A strain gage monitor for amplifying, conditioning and presenting a strain gage signal, from a strain gage transducer means, comprising:

a. A first regulated power supply means for supplying a regulated positive amplifier voltage;
   b. A second regulated power supply means for supplying a regulated negative amplifier voltage;
   c. Oscillator means connected to the first and second regulated power supplies for supplying a AC carrier signal;
   d. An oscillator remote driving amplifier means connected to the oscillator means for amplifying said AC carrier signal and driving said strain gage transducer means;
   e. A differential amplifier means whose two inputs are connected across the strain gage transducer means for amplifying the AC output signal therefrom, the amplitude of said AC output signal being proportional to the amount of strain experienced by said strain gage transducer means.
   f. A demodulator means connected to said differential amplifier means for converting the value of the amplitude of the output signal from the differential amplifier means to a DC voltage value,
   g. An operational amplifier active filter system means connected to the demodulator means for amplifying the demodulated strain gage transducer signal and eliminating transients;
   h. A peak memory system means connected to the operational amplifier active filter system, including an electrometer and capacitor connected to the operational amplifier active filter for storing the highest value of a demodulated strain gage signal from the strain gage transducer means over a fixed finite period of time, a peak amplifier connected to the electrometer for sensing for information improperly stored in said electrometer and for correcting for said improper storage, and a transistor switch connected to said electrometer for converting the electrometer output to a continuous output;
   i. Indicator means connected to said peak memory system for displaying the output therefrom to indicate the amount of strain on said strain gage transducer means;

2. The strain gage monitor of claim 1 where in the indicator means includes a limit detector amplifier system means connected to said peak memory system means for comparing the electrometer output with a preset reference signal; and a relay means connected to the limit detector amplifier system for switching when the percentage of the maximum allowable amount of strain on a punch press, as sensed by the strain gage transducer means, is greater than a set percentage as detected by the limit detector amplifier system means.

* * * * *